No. 680,462. Patented Aug. 13, 1901.
G. MUMBY.
LUG USED IN COUPLING, TIGHTENING, AND FASTENING METAL HOOPS OR RODS ABOUT CASKS, TANKS, &c.
(Application filed Feb. 21, 1901.)
(No Model.)
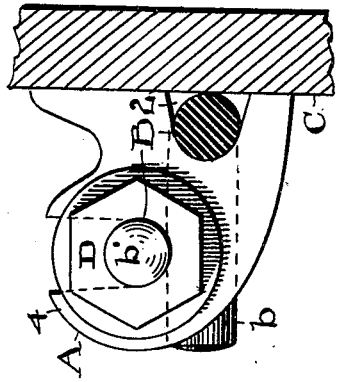
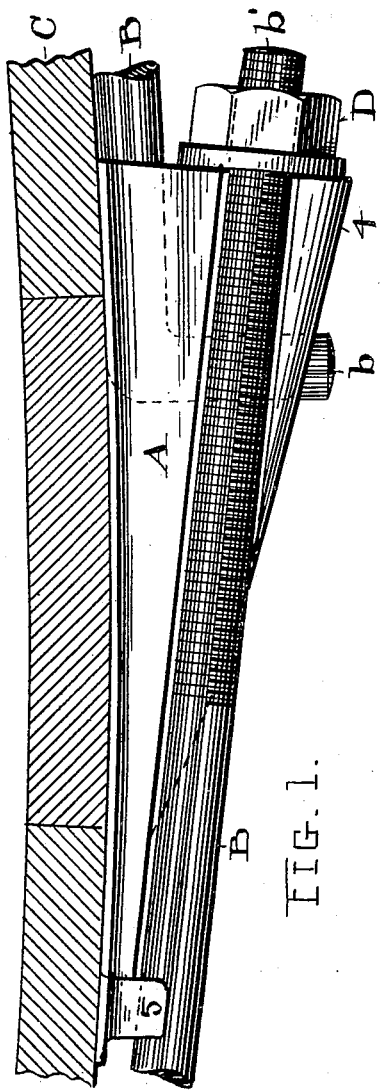
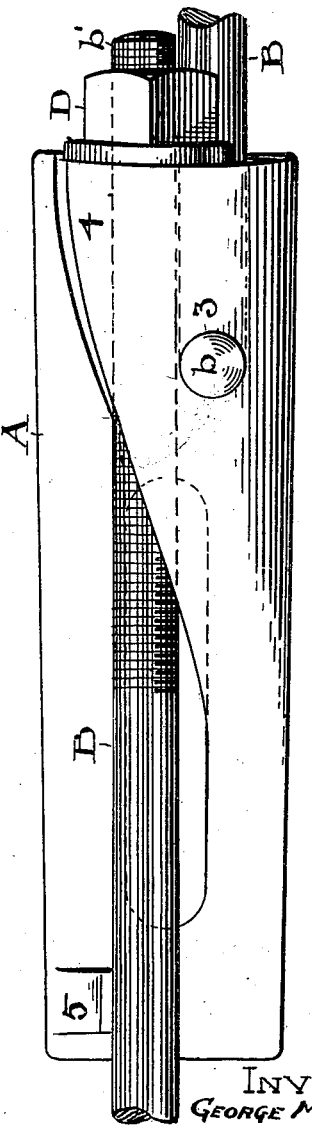
ATTEST
R. B. Mooser
H. E. Mudra.
INVENTOR
GEORGE MUMBY
BY W. T. Fisher ATTY

UNITED STATES PATENT OFFICE.

GEORGE MUMBY, OF HILO, TERRITORY OF HAWAII.

LUG USED IN COUPLING, TIGHTENING, AND FASTENING METAL HOOPS OR RODS ABOUT CASKS, TANKS, &c.

SPECIFICATION forming part of Letters Patent No. 680,462, dated August 13, 1901.

Application filed February 21, 1901. Serial No. 48,302. (No model.)

*To all whom it may concern:*

Be it known that I, GEORGE MUMBY, a citizen of the United States of America, residing at Hilo, in the Territory of Hawaii, have invented certain new and useful improvements in lugs used in coupling, tightening, and fastening metal hoops or rods about casks, tanks, and other containers; and I do declare that the following is a full, clear, and exact description of the invention, which will enable others skilled in the art to which it appertains to make and use the same.

My invention relates to an improvement in lugs for coupling iron rods or round hoops, and the invention is used particularly for fastening iron hoops about water-tanks and other large containers.

In the accompanying drawings, Figure 1 is a plan view of my improved lug and ends of a rod or hoop secured therein and lying against a portion of tank shown in cross-section and as it appears when in use looking down on the same. Fig. 2 is a side or outside elevation of the "lug," so called, and end sections of a rod or hoop engaged therein, as seen in Fig. 1. Fig. 3 is an end elevation of the parts shown in Fig. 1 looking in from the right and disclosing also the section of tank against which the lug rests.

The lug A as thus shown is made preferably of malleable iron, but other suitable metal will do, and is fashioned to use with a rod or hoop of any desired size and for any desired size of tank or cask, the inner surface conforming to the radius of the tank, cask, or other container to which it is applied. Hence different sizes can be made, according to the special need. As shown, the said lug has a right-angled seat for end *b* of the hoop B, and this seat is formed by a groove 2, open on the inside of the lug, running to a transverse hole 3, which opens to the outside of the lug at right angles through groove 2, and the end *b* of the hoop or rod is bent at right angles into a hook shape and inserted from the inside through the said hole 3 before the lug is placed upon or against the cask C. When in position on the cask, the cask confines the hook, so that it cannot pull out laterally, and also gives strength to the hoop portion *b* and affords a very firm and serviceable engagement in this way for the hoop or rod. This construction is of advantage and value because it obviates the necessity of heading the end of the rod or hoop and of threading said end and applying a nut thereto, with the further advantage that the right-angled hook extremity on the rod prevents it from turning after being put in place. The other end *b'* of the rod or hoop is threaded and engaged by a nut D, bearing against the enlarged end of the lug A, as seen in Fig. 1, and the said lug has a longitudinally-inclined open groove or channel, in which the threaded end of the said lug rests, as shown.

The outside flanged portion 4 of said groove or channel is deepened and enlarged, as seen in Fig. 3, especially to form part of the bearing for nut D, and the said flange 4 extends well above rod D, as seen in Fig. 2, so as to make the end support for said rod practically equivalent to a bore longitudinally through lug A, and thus affording perfect security for the engagement of the rod by its confining-nut. A lip or hook 5 at the other end of lug A overlaps rod B from above more or less and serves to help to hold the lug steadily in its place and from dropping down at that end. When nut D is screwed up and tightly fastened, the lug A is prevented from turning in any wise by the means thus shown and described or of becoming displaced while in use. Hence after bending the rod about the tank and dropping end *b'* down into its groove and tightening up the rod or hoop, it will be securely held without other means of fastening. Another and important advantage of this construction is that when a hoop thus engaged at its ends is put in place on the tank it cannot possibly loosen and get displaced when the tank for any reason shrinks from drying or otherwise, and the simplicity of construction and its very great convenience, as well as durability, are evident. The hook or lip 5 also is material when it comes to placing the hoop about the tank and holding the parts in working relation before the hoop is tightened up by nut D.

What I claim is—

1. The lug for locking the ends of a rod or hoop for tanks, the same having one end constructed to fasten both ends of the hoop, said end having a right-angled seat for one end of the hoop formed with a groove 2 open on the inside of the lug its full length and hole 3 extending outward through the lug, and a longitudinal lengthwise inclined groove on the outside of the lug overlapping the hole 3 at the top and having flange 4 at its outside, substantially as described.

2. The lug for locking together the ends of a rod or hoop having a substantially right-angled seat formed on its inner side at one end with an open groove lengthwise and a hole through the lug at right angles to said groove, and a channel lengthwise of the lug on its outside and across said hole above the same, and a lip 5 on the lug at its other end, in combination with the hoop B having one end bent at right angles and engaged in said right-angled seat and pressed against the tank, and the opposite end of the hoop lying in said channel and secured by a nut, substantially as described.

Witness my hand to the foregoing specification this 8th day of November, 1900.

GEORGE MUMBY.

Witnesses:
CHARLES F. PARSONS,
CARL S. SMITH.